United States Patent [19]

Ou et al.

[11] 4,394,926
[45] Jul. 26, 1983

[54] REVERSE BUCKLING RUPTURE DISK APPARATUS

[75] Inventors: Sam A. Ou, Bixby; Ronald J. LaPelle, Tulsa, both of Okla.

[73] Assignee: BS & B Safety Systems, Inc., Tulsa, Okla.

[21] Appl. No.: 350,100

[22] Filed: Feb. 18, 1982

[51] Int. Cl.³ ............................................. F16K 17/40
[52] U.S. Cl. .................................. 220/89 A; 137/68 R
[58] Field of Search ........................... 220/89 A, 89 R; 137/68 R

[56] References Cited

U.S. PATENT DOCUMENTS 3,294,277 12/1966 Wood ................................ 220/89 A
3,872,874 3/1975 Nedelec et al. .................... 220/89 A
4,079,854 3/1978 Shaw et al. ........................ 220/89 A

FOREIGN PATENT DOCUMENTS 233387 12/1968 U.S.S.R. ............................ 220/89 A

Primary Examiner—Allan N. Shoap
Assistant Examiner—Robert Petrik
Attorney, Agent, or Firm—C. Clark Dougherty, Jr.

[57] ABSTRACT

An improved reverse buckling rupture disk apparatus which includes a reverse buckling rupture disk, an annular rupture disk support member and knife structure for severing the rupture disk upon the reversal thereof. The knife structure are comprised of at least three blade legs having sharpened cutting edges formed thereon facing the rupture disk attached together at the internal ends thereof and attached to or supported by the annular support member at the external ends thereof. Each of the blade legs has at least a portion of the cutting edge thereof inclined towards the rupture disk from the internal end to the external end thereof whereby upon reversal of the rupture disk, the rupture disk is progressively severed by the cutting edges of the blade legs from points near the periphery of the reversing portion of the rupture disk to the center of the rupture disk.

2 Claims, 7 Drawing Figures

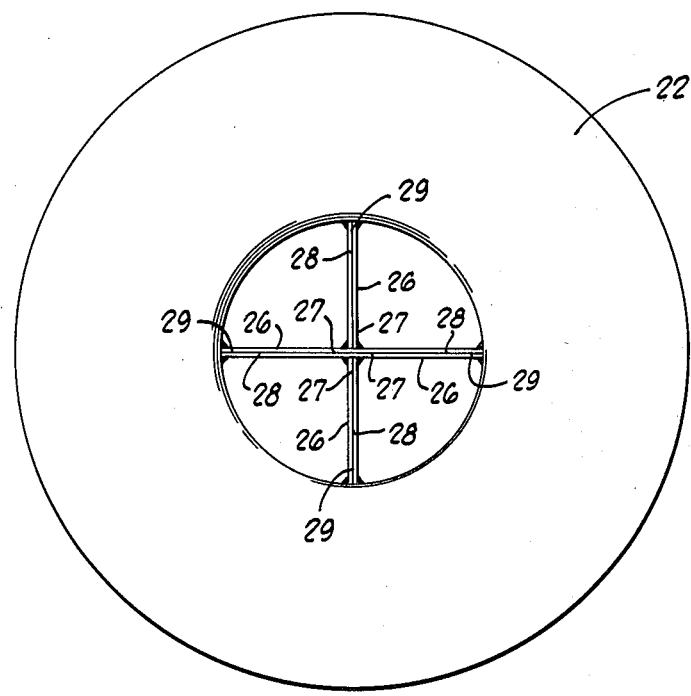
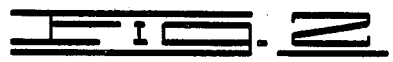
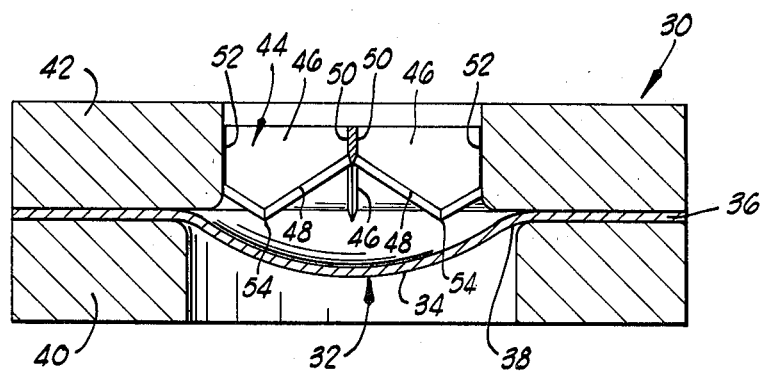
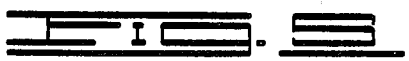

REVERSE BUCKLING RUPTURE DISK APPARATUS

BACKGROUND OF THE INVENTION

1. Field of the Invention

The present invention relates generally to an improved reverse buckling rupture disk apparatus, and more particularly, but not by way of limitation, to a reverse buckling rupture disk assembly including a reverse buckling rupture disk, at least one annular support member and knife means for severing the rupture disk upon the reversal thereof.

2. Description of the Prior Art

Reverse buckling rupture disk apparatus including a reverse buckling rupture disk, at least one annular support member for supporting the rupture disk in a pressure relief area and knife means for severing the rupture disk upon the reversal thereof have been developed and used heretofore. For example, see U.S. Pat. No. 3,294,277 issued Dec. 27, 1966.

A variety of knife means have been utilized in such reverse buckling rupture disk assemblies. The most common such knife means have been comprised of three or more blade legs having sharpened cutting edges formed thereon attached together at the internal ends and attached to the support member at the external ends thereof. Upon reversal of the rupture disk, the reversing portion thereof contacts the blade legs and is severed whereby full opening of the rupture disk occurs. Most of the prior knife means of the type described above have included four blade legs attached together at the internal ends at right angles to each other and attached at the external ends to the rupture disk support member.

In substantially all of such heretofore used knife means, the cutting edges formed on the blade legs are positioned either in a single plane which is parallel to the plane of the peripheral portion of the rupture disk and the support member seating surface therefor, or the cutting edges of the blade legs are inclined towards the rupture disk from the external ends to the internal ends thereof. Such cutting edge configurations generally bring about the severing of the rupture disk from the center of the reversing portion of the rupture disk outwardly. That is, the reversing portion of the rupture disk is first cut by the cutting edges of the blade legs at the center thereof and the cutting process proceeds progressively outwardly from the center to the periphery of the reversed portion. This cutting process or mode sometimes results in the reversal of the rupture disk without the rupture disk being severed because the reversal of a reverse buckling rupture disk begins at the side or transition connection area and progresses inwardly. That is, when a reverse buckling rupture disk reverses prematurely, i.e., at a fluid pressure level lower than the predetermined design rupture pressure thereof, due to damage to the disk during handling or installation or other similar cause, the reversal takes place from a side of the reversing portion inwardly and can take place slowly or only partial reversal can result whereby the central portion of the rupture disk does not contact the heretofore used knife means with enough force to sever the rupture disk. When reversal without severing takes place, a dangerous overpressure condition in the vessel or system being protected can result before the rupture disk ruptures.

As is well understood by those skilled in the art, it is generally necessary for a reverse buckling rupture disk assembly to be designed such that if premature reversal takes place without the disk being severed by the knife means, the reversed disk ultimately ruptures at a pressure level no more than 1.5 times the predetermined design rupture pressure. The reason for this is that the predetermined design rupture pressure is usually at a level equal to or near the working pressure of a vessel or system being protected and such vessel or system can withstand and is tested to a maximum pressure of 1.5 times the working pressure. If a reverse buckling rupture disk prematurely reverses and is not severed by the knife means, in some applications a pressure level exceeding 1.5 times the predetermined design rupture pressure of the disk must be exerted on the disk to bring about the severance thereof. Thus, heretofore, in such applications, the possibility of a dangerous overpressure condition being allowed to occur in the vessel or system being protected has existed.

By the present invention an improved reverse buckling rupture disk apparatus is provided whereby the severing of the rupture disk upon its premature reversal is insured at a pressure level no greater than 1.5 times the predetermined design rupture pressure of the disk. The term "predetermined design rupture pressure" is used herein to mean the predetermined fluid pressure differential which must be exerted on a normally functioning reverse buckling rupture disk to cause the rupture disk to reverse.

SUMMARY OF THE INVENTION

An improved reverse buckling rupture disk apparatus comprising a reverse buckling rupture disk, at least one support member for supporting the rupture disk in a pressure relief area and knife means attached to the support member and positioned with respect to the rupture disk whereby upon the reversal of the rupture disk it is severed by the knife means. The knife means includes at least three blade legs having sharpened cutting edges thereon attached together at the internal ends thereof and attached to the support member at the external ends thereof. Each of the balde legs has at least a portion of the cutting edge thereof inclined towards the rupture disk from the internal end to the external end thereof whereby upon reversal of the rupture disk it is progressively severed by the cutting edges of the blade legs from points adjacent the periphery of the reversing portion of the rupture disk to the center of the rupture disk.

It is, therefore, a general object of the present invention to provide an improved reverse buckling rupture disk apparatus.

A further object of the present invention is the provision of a reverse buckling rupture disk apparatus whereby upon the reversal of the rupture disk, the severing thereof by the knife means is insured.

Yet a further object of the present invention is the provision of a reverse buckling rupture disk apparatus including improved knife means wherein if premature reversal of the rupture disk takes place due to damage to the rupture disk during handling or installation or other similar cause, the rupture disk is severed by the knife means at a fluid pressure level no greater than 1.5 times the predetermined design rupture pressure of the rupture disk.

Other and further objects, features and advantages of the present invention will be readily apparent to those

BRIEF DESCRIPTION OF THE DRAWINGS

FIG. 2 is a cross-sectional view taken along line 2—2 of FIG. 1.

FIG. 5 is a cross-sectional view of an alternate embodiment of the apparatus of the present invention.

DESCRIPTION OF PREFERRED EMBODIMENTS

Figure 1:
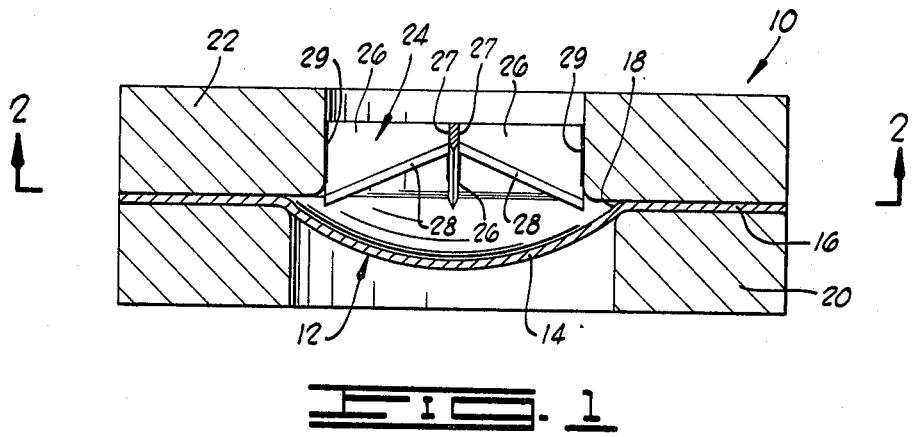
FIG. 1 is a side cross-sectional view of one embodiment of the reverse buckling rupture disk apparatus of the present invention.

Referring now to the drawings, and particularly to FIGS. 1-4, the apparatus of the present invention is illustrated and generally designated by the numeral 10. The apparatus 10 is comprised of a reverse buckling rupture disk 12 having a concave-convex portion 14 connected to an annular flat flange portion 16 by a transition connection 18. The annular flat flange portion 16 of the rupture disk 12 is supported between an annular inlet support member 20 and an annular outlet support member 22. The annular support members 20 and 22 are adapted to be sealingly clamped between bolted companion flanges or other clamping device (not shown), and as is well understood by those skilled in the art, the inlet and outlet support members 20 and 22 can take a variety of shapes and forms. In addition, the inlet support member 20 can be omitted depending upon the particular application and installation of the apparatus 10.

Attached to the outlet support member 22 and positioned within the internal area thereof is a knife means 24 for severing the concave-convex portion 14 of the rupture disk 12 upon the reversal thereof. In the most preferred form as illustrated in the drawings, the knife means 24 includes four blade legs 26 which are connected together at their internal ends 27 at right angles to each other and attached to the internal surface of the annular support member 22 at their external ends 29 such as by welding. As indicated above, the knife means 24 can include three blade legs 26 or more than four blade legs 26, if desired.

Each of the blade legs 26 includes a sharpened cutting edge 28 formed thereon facing the reverse buckling rupture disk 12. In accordance with the present invention, at least portions of the cutting edges 28 of the blade legs 26 are inclined towards the rupture disk 12 from the internal ends 27 thereof to the external ends 29 thereof. Further, portions of the cutting edges 28 of the blade legs 26 at the external ends 29 thereof preferably extend towards the rupture disk 12 a distance past the plane of the side of the annular flat flange portion 16 thereof engaging the annular support member 20.

Figure 3:
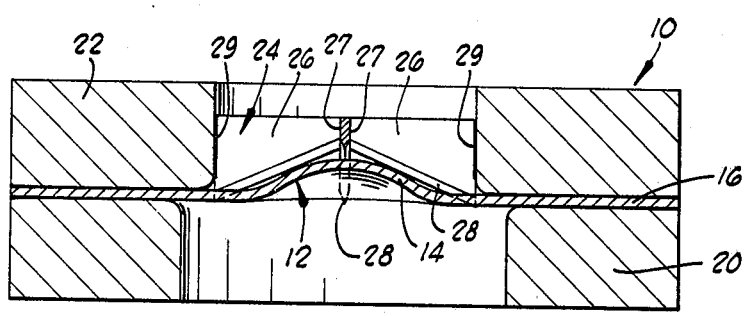
FIG. 3 is a cross-sectional view similar to FIG. 1 but showing the rupture disk in a partially reversed and severed position.

As mentioned above, when the fluid pressure exerted on the convex side of the reverse buckling rupture disk 12 reaches the predetermined design rupture pressure of a rupture disk 12 or when the rupture disk 12 reverses itself at a lower pressure level due to damage or other reason, the reversal process starts at or near the transition connection 18 of the rupture disk 12 and progresses towards the center of the concave-convex portion, i.e., the concave-convex portion 14 rolls inwardly from the transition connection to a reversed position as shown in FIG. 3. Because portions of the cutting edges 28 of the blade legs 26 at the ends 29 thereof extend toward the rupture disk 12 past the plane of the side of the annular flat flange portion 16 of the rupture disk 12 facing away from the support member 20 when either complete or partial reversal of the concave-convex portion 14 takes place, the concave-convex portion is penetrated by one or more of the extended portions of the cutting edges 28. This side penetration of the rupture disk 12 insures that the rupture disk 12 does not reverse without being penetrated or severed.

Figure 4:
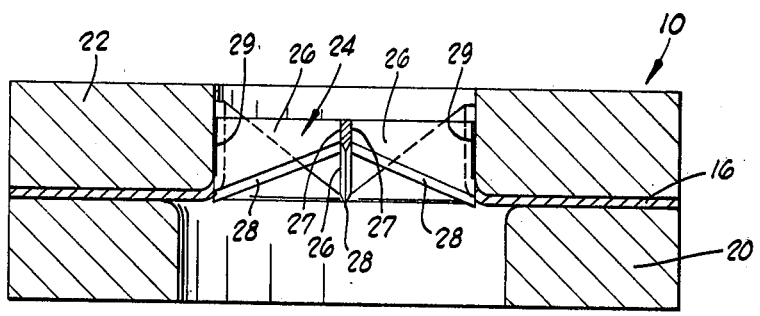
FIG. 4 is a cross-sectional view similar to FIG. 1 but showing the apparatus after the disk has reversed and been severed.

As shown in FIG. 4, after the concave-convex portion 14 of the rupture disk 12 reverses itself and is penetrated, the concave-convex portion is progressively severed by the cutting edges 28 of the blade legs 26 from the sides of the reversing portion to the center thereof whereby the reversing portion is folded into the internal area of the annular support member 22 in four petals or sectors. Thus, the blade means 24 of the present invention brings about the immediate side penetration of the rupture disk 12 upon reversal or partial reversal thereby insuring that an overpressure condition does not occur in the vessel or system being protected.

Referring now to FIG. 5 an alternate embodiment of the apparatus of the present invention is illustrated and generally designated by the numeral 30. The apparatus 30 is similar to the apparatus 10 and includes a reverse buckling rupture disk 32 having a concave-convex portion 34 connected to an annular flat flange portion 36 by a transition connection 38. The annular flange portion 36 of the rupture disk 32 is supported between inlet and outlet annular support members 40 and 42. Attached within the interior portion of the outlet support member 42 is a knife means 44 comprised of four blade legs 46 having sharpened cutting edges 48 formed thereon facing the rupture disk 32. The blade legs 46 are attached together at their internal ends 50 at right angles to each other and are attached to the support member 42 at the external ends 52 thereof.

Instead of being inclined towards the rupture disk 32 over their full length, the cutting edges 48 of the blade legs 46 are inclined towards the rupture disk 32 from the internal ends 50 thereof to points between the ends 50 and 52 thereof whereupon the cutting edges 48 are inclined away from the rupture disk 32 to the external ends 52 thereof. This configuration forms sharpened apices 54 on the blade legs 46. Each of the apices 54 extends beyond the plane of the annular flange portion 36 of the rupture disk 32 facing away from the support member 42. Upon reversal of the concave-convex portion 34 of the rupture disk 32, the reversing portion is penetrated by the apices 54 of the blade legs 46 at side locations. That is, upon reversal, the concave-convex portion 34 of the rupture disk 32 is immediately penetrated by the apices 54 of the blade legs 46 thereby insuring penetration or severance of the rupture disk 32 when it reverses regardless of the cause of the reversal or the manner in which the reversal takes place.

Figure 6:
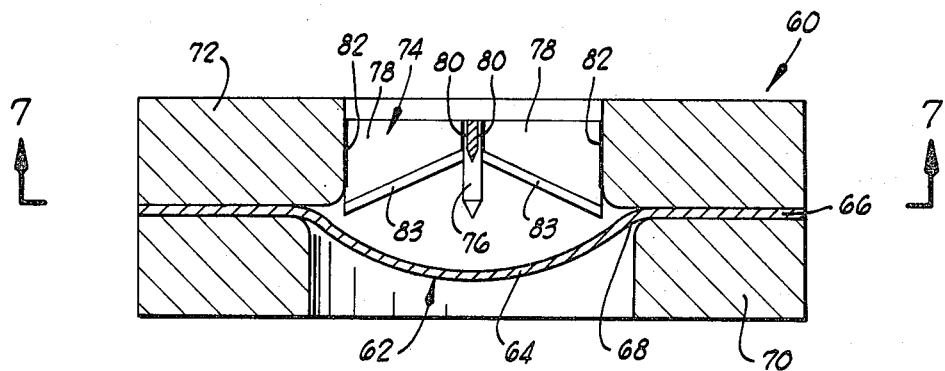
FIG. 6 is a cross-sectional view of yet another alternate embodiment of the apparatus of the present invention.
Figure 7:
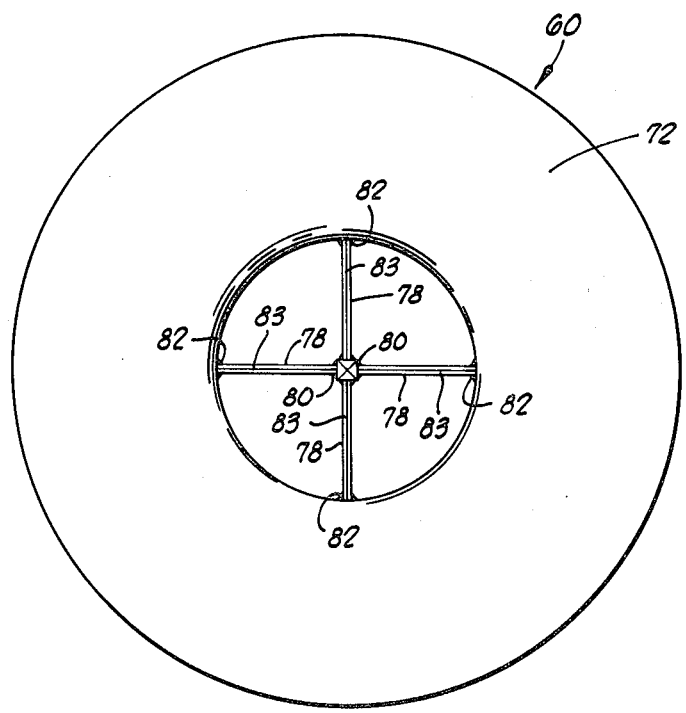
FIG. 7 is a cross-sectional view taken along line 7—7 of FIG. 6.

Referring now to FIGS. 6 and 7, yet an alternate embodiment of the apparatus of the present invention is illustrated and generally designated by the numeral 60. The apparatus 60 includes a reverse buckling rupture disk 62 having a concave-convex portion 64 connected to an annular flat flange portion 66 by a transition connection 68. The annular flange portion 66 of the rupture disk 62 is supported between annular inlet and outlet rupture disk support members 70 and 72, respectively, and a knife means 74 is attached within the interior of the outlet support member 72. The knife means 74 is identical to the knife means 24 described above except that it includes a centrally positioned sharpened spike 76 extending towards the rupture disk 62. That is, the knife means 74 includes four blade legs 78 attached together at right angles at the interior ends 80 thereof and attached to the supporting member 72 at the exterior ends 82 thereof. Each of the blade legs 78 includes a sharpened cutting edge 83 formed thereon which is inclined towards the rupture disk 62 from the internal end 80 thereof to the external end 82 thereof. In addition, the cutting edges of the blade legs 78 at the exterior ends 82 thereof extend towards the rupture disk 62 beyond the plane of the annular flat flange portion 66 which faces away from the annular support member 72. The sharpened spike 76 is attached to the knife means 74 at the interior ends of the blade legs 78 whereby it is positioned longitudinally with the sharpened end thereof facing the rupture disk 62.

When the concave-convex portion 64 of the rupture disk 62 reverses itself, it is penetrated by the portions of the cutting edges 83 of the blade legs 78 extending beyond the plane of the annular flange portion 66 of the rupture disk 62 in the manner described above in connection with the knife means 24. In addition, the spike 76 penetrates the rupture disk 62 at the center of the concave-convex portion 64 thereof which further insures penetration of the rupture disk 62 regardless of the reason for or manner of the reversal.

As will be understood, in all of the embodiments of the present invention described above, gaskets may be positioned between the annular flange portions of the rupture disks and the support members to insure fluid-tight seals therebetween. In this event, as well as when gaskets are not utilized, the portions of the cutting edges of the blade legs extending towards the rupture disks beyond the planes of the annular flange portions thereof extend distances such that side penetration of the disks takes place when the disks reverse or partially reverse.

Thus, the present invention is well adapted to carry out the objects and attain the ends and advantages mentioned as well as those inherent therein. While numerous changes in the arrangement and construction of the various parts of the apparatus of this invention will suggest themselves to those skilled in the art, such changes are encompassed within the spirit of the invention as defined by the appended claims.

What is claimed is:

1. An improved reverse buckling rupture disk apparatus comprising:
    a reverse buckling rupture disk including a concave-convex portion connected to an annular flat flange portion by a transition connection;
    at least one support member for supporting said flat flange portion of said rupture disk in a pressure relief area; and
    knife means attached to said support member and positioned with respect to the concave-convex portion of said rupture disk whereby upon the reversal thereof, said concave-convex portion is severed by said knife means, said knife means comprising:
        four blade legs positioned at right angles to each other having sharpened cutting edges thereon attached together at the internal ends thereof and attached to said support member at the external ends thereof, each of said blade legs having at least a portion of the cutting edge thereof inclined towards said rupture disk from the internal end to the external end thereof and having a portion of the cutting edge adjacent the transition connection of said rupture disk extending towards the concave-convex portion thereof beyond the plane of the annular flange portion thereof whereby upon reversal of the concave-convex portion of said rupture disk, said concave-convex portion is progressively severed by said cutting edges of said blade legs from points adjacent said transition connection to the center of said concave-convex portion of said rupture disk; and
        a spike attached to said knife means at the point where the internal ends of said blade legs are attached together positioned extending towards said rupture disk whereby upon reversal of said concave-convex portion of said rupture disk, said concave-convex portion is punctured by said spike.

2. In a reverse buckling rupture disk assembly including a reverse buckling rupture disk having a concave-convex portion connected to an annular flat flange portion by a transition connection, at least one annular support member for supporting said rupture disk in a pressure relief area and knife means supported in said assembly for severing the concave-convex portion of said rupture disk upon the reversal thereof, the improvement which comprises:
    said knife means including four blade legs positioned at right angles to each other having sharpened cutting edges thereon facing said rupture disk, said blade legs being attached together at the internal ends thereof and attached to said support member at the external ends thereof;
    each of said blade legs having at least a portion of the cutting edge thereof inclined towards said rupture disk from the internal end to the external end thereof and having a portion of said cutting edge adjacent the transition connection of said rupture disk extending towards the concave-convex portion of said rupture disk beyond the plane of the annular flat flange portion thereof whereby upon reversal of the concave-convex portion of said rupture disk, said concave-convex portion is progressively severed by said cutting edges of said blade legs from points adjacent the transition connection of said rupture disk to the center of said rupture disk; and
    a spike attached to said knife means at the point where the internal ends of said blade legs are attached together positioned to extend towards said rupture disk whereby upon reversal of said concave-convex portion of said rupture disk, said concave-convex portion is punctured by said spike.

* * * * *